(12) United States Patent
Cain

(10) Patent No.: US 8,042,187 B2
(45) Date of Patent: Oct. 18, 2011

(54) SECURITY INDICATION SPANNING TREE SYSTEM AND METHOD

(75) Inventor: Stuart Cain, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2686 days.

(21) Appl. No.: 10/648,531

(22) Filed: Aug. 25, 2003

(65) Prior Publication Data

US 2005/0050350 A1 Mar. 3, 2005

(51) Int. Cl.
*G06F 21/00* (2006.01)
*H04L 12/06* (2006.01)

(52) U.S. Cl. .......................................... 726/25; 705/7.28

(58) Field of Classification Search ..................... 726/25
See application file for complete search history.

(56) References Cited

U.S. PATENT DOCUMENTS

| 5,850,516 | A | 12/1998 | Schneier | |
|---|---|---|---|---|
| 6,535,227 | B1 * | 3/2003 | Fox et al. | 715/736 |
| 2002/0073338 | A1 * | 6/2002 | Burrows et al. | 713/201 |
| 2003/0056116 | A1 * | 3/2003 | Bunker et al. | 713/201 |
| 2004/0015728 | A1 * | 1/2004 | Cole et al. | 713/201 |

FOREIGN PATENT DOCUMENTS

| GB | 2 372 400 | 8/2002 |
|---|---|---|
| WO | WO 02/062049 | 8/2002 |
| WO | WO 03/069840 | 8/2003 |
| WO | WO 2004/031925 | 4/2004 |

* cited by examiner

*Primary Examiner* — Gilberto Barron, Jr.
*Assistant Examiner* — Devin Almeida

(57) ABSTRACT

A security indication spanning tree system and method is presented. In one embodiment the asset value of a network node is determined. The exposure rating of said network node is ascertained. The impact risk to a preferred functionality due to an attack from another network node is analyzed. A spanning tree schematic of a network including the network node is created, wherein the spanning tree schematic includes an indication of the asset value.

20 Claims, 4 Drawing Sheets

US 8,042,187 B2

SECURITY INDICATION SPANNING TREE SYSTEM AND METHOD

FIELD OF THE INVENTION

The present invention relates to security. More particularly, the present invention relates to a system and method for creating a security indication spanning tree.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the use of networked resources that facilitate leveraged use of centralized utility and data resources by distributed components. While the leveraged utilization of the centralized resources is advantageous, organization and maintenance of the centralized resources is usually very complex and often susceptible to the spread of detrimental intrusive attacks.

Centralizing certain resources within a distributed network typically provides desirable benefits. For example, centrally storing and/or processing information typically reduces wasteful duplicative storage and/or processing resources at each remote networked system. In addition to increasing efficiency, the functions provided and supported by centralized resources typically have significant economic value. The ever increasing demand for centralized type services is largely attributable to the ever growing cost of specialized information technology services and the increasing complexity of managing mission critical Enterprise and Internet applications. Interruptions in services and support for important applications implemented by the centralized resources due to intrusive attacks can be very costly. In supporting desirable flexibility and extensibility, centralizing resources can involve handling diverse applications, architectures and topologies (e.g., associated with a multi-vendor environment). Managing the infrastructure of a large and complicated centralized networked resource environment and protecting the resources from intrusive attacks raises many challenging operational issues.

Providing security for important centralized network assets is usually very important and also often complex. Offering ubiquitous access to a diverse set of centralized resources introduces challenges associated with protecting the centralized resources from intrusive attacks (e.g., that can detrimentally affect service quality). Modern networks can be very extensive and typically include numerous potential points of attack for intrusion. If an attack is able to "infiltrate" or overcome security measures at a particular point there is often an opportunity for the attack to spread rapidly and relatively unimpeded throughout a network. The devices in a network can be configured or associated to provide functionality and/or service for a variety of applications. Attacks directed to a single device or aspect of a network can be very harmful. The spread of the attack or intrusion throughout a network internally to impact applications implemented on and/or supported by the network can be devastating.

Intrusion attempts directed towards centralized resources are usually initially directed at penetrating from a single point or device and then to spread from that device to other devices in a centralized resource network or "internal" network. Traditional intrusion protection systems typically focus on preventing the initial breach of an individual component from devices outside internal networks. For example, a host intrusion detection system (HIDS) usually tries to detect intrusion on a host. A HIDS is usually limited to sensing very localized events and often only detects events on a particular host system and no where else. Another example of security system is a network intrusion detection system (NIDS). The NIDS usually tries to detect intrusions directed at traffic on a network segment. For example, NIDS are usually limited to sniffing network traffic at individual switching points. While NIDS may often be deployed to service a rather significant part of a network, it is usually limited to deployment at individual network egress points. While traditional intrusion protection often provides an initial line of defense or intrusion protection, breaching individual component security measures often occurs at an undesirable rate.

The most significant damage resulting from an intrusive attack on a component of a network usually occurs as a result of an intrusive attack spreading throughout the network. For example, an attack may be initially directed towards a relatively unimportant and/or unprotected component of a network. In and of itself the initial attack on a "weak" component may have little or no practical affect on the performance and functionality of the components in supporting various applications and systems, including important applications and systems. This may even be a reason for not expending security protection resources to protect the component. However, if the attack spreads from the "weak" component to a more critical component (e.g., a component that provides significant functionality for supporting important applications and systems), it could have a very significant affect on crucial performance and functional support. Even if significant resources are expended to protect the important component from attacks outside the network, they are essentially wasted if the component is susceptible to attacks from other components within the network. This is a significant consideration since once an initial breach is made, attacks typically spread in traditional systems and networks with little or no opposition.

Identifying devices in a centralized resource network or internal network that support important applications and are relatively more susceptible to attack internally is often complicated. Traditional attempts at preventing the spread of an attack usually involves manual coordination and analysis of individual alarms and potential impact on other devices in a system. Prior attempts at stopping the spread of an attack are usually laborious and often requires a significant level of knowledge and expertise on the priority of different applications and the functionality particular network components contribute to the applications. The complexity of a network and the numerous different applications and/or systems that rely on a component can also increase susceptibility to flaws associated with human error, which tends to increase when attempting to identify the important and susceptible internal centralized resources during an intrusive attack.

SUMMARY OF THE INVENTION

A security indication spanning tree system and method is presented. In one embodiment the asset value of a network node is determined. The exposure rating of said network node is ascertained. The impact risk to a preferred functionality due to an attack from another network node is analyzed. A spanning tree schematic of a network including the network node is created, wherein the spanning tree schematic includes an indication of the asset value.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

The present invention facilitates flexible consolidation and correlation of potential disruptions to components of a network from internal spreading of an intrusive attack. The present invention is capable of prioritizing the functionality provided by components and factoring the prioritization into a security threat indication. In one embodiment, a spanning tree representation of a centralized resource network (e.g., server farm, UDC, etc.) is built with asset value and exposure or connectivity indicators. In one exemplary implementation the asset value corresponds to the economic value of functions provided by a network component in the support of various applications. The present invention also reduces resources required to coordinate and implement an effective presentation of a network component susceptibility to an intrusive attack spreading throughout the component internally.

Figure 1:
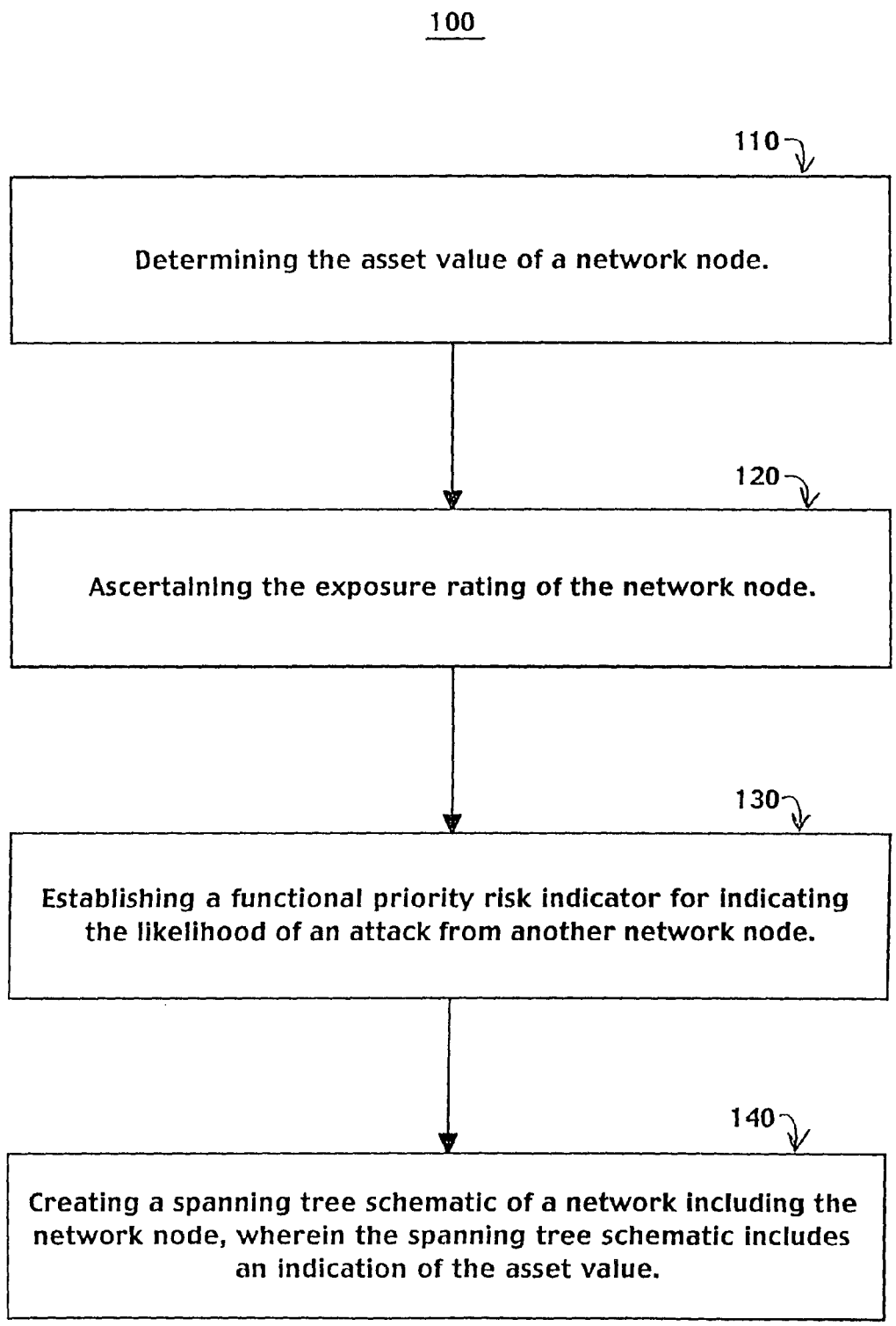
FIG. 1 is a flow chart of a security indication spanning tree method in accordance with one embodiment of the present invention.

FIG. 1 is a flow chart of security indication spanning tree method 100 in accordance with one embodiment of the present invention. Spanning tree method 100 provides a spanning tree representation of a network with potential internal attack indications. The indications can include factors for susceptibility of a component to attack from other components in the network and importance or impact of a disruption in the operations of a component with respect to support for various applications.

In step 110, the asset value of a network node is determined. In one embodiment the asset value provides an indication of the economic value or utility of the functions provided by the network node. In one exemplary implementation the asset value corresponds to the economic impact of a disruption to the functionality provided by the network node. For example, if a disruption in operations to a particular network node (e.g., due to an intrusion attack) has a high economic impact the network node can be assigned a relatively high asset value indicator (e.g., a value of 9 out of possible 10 maximum). If the disruption in operations to a particular network node has a moderate economic impact the network node can be assigned a moderate asset value indicator (e.g., a value of 5 out of possible 10 maximum). If the disruption in operations to a particular network node has a low economic impact the network node can be assigned a relatively low asset value indicator (e.g., a value of 2 out of possible 10 maximum).

The exposure rating of the network node is ascertained at step 120. In one embodiment of the present invention, an exposure rating defines a threshold value corresponding to the connectivity of the network node with other network nodes. In one exemplary implementation, each network node is given an exposure rating value depending upon its "connectivity distance" (e.g., number of nodes) from a root node (e.g. a root node can be the node "closest" or directly coupled to an external network), with the root node having the highest value. The further the network node is from the root node the smaller the exposure rating value. The bandwidth of connections between network nodes can also be factored into the exposure rating value. For example, links with high bandwidth can increase the exposure rating.

With continued reference to FIG. 1, a functional priority risk indicator for indicating the likelihood of an attack from another network node is established in step 130. The functional priority can be associated with the economic benefit or utility a particular functionality provides. In one embodiment of the present invention, an analysis of the functional priority risk indicator includes consideration of the importance or value of the network node to a preferred functionality and the susceptibility of the network node to attack. The analysis can utilize the exposure rating value and the asset value to establish a functional priority risk value. For example, the functional priority risk can be defined by an exposure value of a particular network node plus twice the asset value.

In step 140, a spanning tree schematic of a network including the network node is created, wherein the spanning tree schematic includes an indication of the network node asset value. The spanning tree schematic can also include an indication of the exposure rating and an indication of the risk to preferred or high priority functionality. The spanning tree schematic can also provide an indication of the interconnections of a network node to other network nodes.

The present invention is applicable to centralized resources communicatively coupled to form an "internal" network. For example, the "internal" network can be an organization or corporate network with few communication interfaces to other "external" components and/or network thereby forming a relatively isolated and distinct "internal" network. In one exemplary implementation centralized resources form a utility data center (UDC) communicatively configured in a local area network (LAN).

Figure 2:
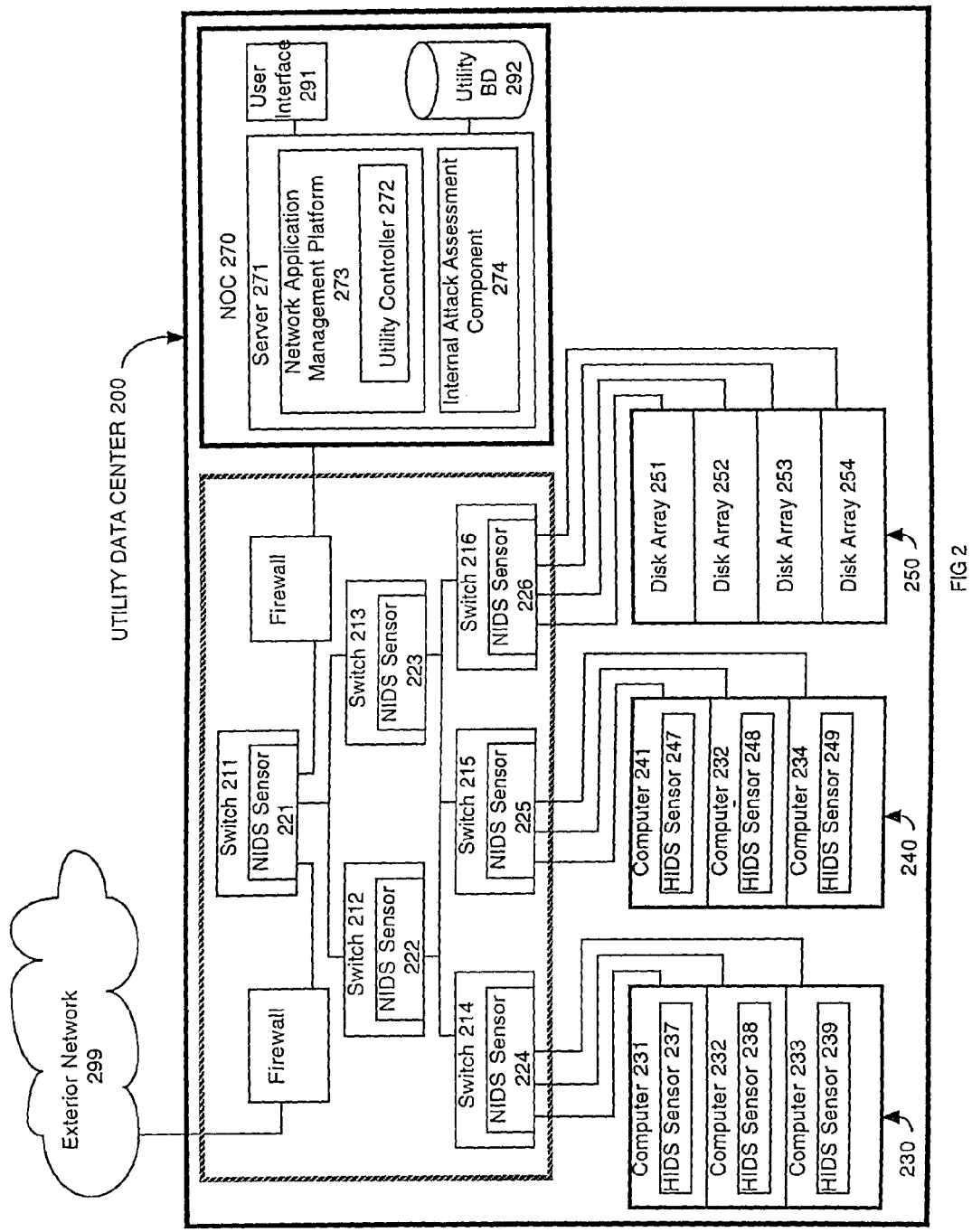
FIG. 2 is a block diagram of an exemplary utility data center (UDC) upon which embodiments of the present invention can be implemented.

FIG. 2 is a block diagram of an exemplary utility data center (UDC) 200 upon which embodiments of the present invention can be implemented. In one embodiment, UDC 200 provides open system support for a plurality of multi-vendor computing resources. As such, the UDC 200 can provide support to computing resources that provide a variety of functions (e.g., firewalls) to numerous different systems and applications. In one embodiment, UDC 200 forms an internal network that is communicatively coupled to exterior network 299. It is appreciated that UDC 200 can include elements in addition to those shown (e.g., more racks, computers, switches and the like), and can also include other elements not specifically shown or described herein. Furthermore, the blocks shown by FIG. 2 can be arranged differently than that illustrated, and can implement additional functions not specifically described herein. It is also appreciated that a number of components (e.g., utility controller, firewalls, servers, etc.) included in UDC 200 can be implemented in varying degrees of hardware, firmware and/or software.

In the present embodiment, UDC 200 includes switches 211 through 216, equipment racks 230, 240 and 250 and network operations center 270. The switches 211 through 216 are communicatively coupled to each other in a switch fabric organization. Each equipment rack 230, 240 and 250 include various equipment. For example, equipment rack 230 includes computers 231 through 233 communicatively coupled to switch 214, equipment rack 240 includes computers 241 through 243 communicatively coupled to switch 215, and equipment rack 250 includes disk arrays 251 through 254 communicatively coupled to switch 216. It is appreciated that the switches 211 through 216 can be coupled to other equipment (not shown), including computers that are not included in an equipment rack. In this embodiment, the switches and computer systems are interconnected using cables or the like. However, wireless connections between devices in UDC 200 are also contemplated.

In general, UDC 200 includes a programmable infrastructure that enables the virtual connection of selected computing resources as well as the isolation of selected computing resources, thereby enabling security and segregation of computing resources at varying infrastructure levels. The resources included in UDC 200 can be dynamically programmed to logically reconfigure and "separate" the resources into a number of various virtual local area networks (VLANs). In one exemplary implementation, NOC 270 includes server 271 coupled to a user interface 291 and a utility database 292.

The NOC 270 provides for overall control over the UDC 200. In one embodiment, the NOC 270 acts as an interface to the UDC 200 and is manned by network technicians that monitor the management and allocation of computing resources in the UDC 200. The interface also provides spanning tree schematic information and asset value information for each component of the spanning tree in a coordinated and organized user friendly easy to comprehend presentation. The presentation can also include a exposure rate value for each component and an impact risk indictor for each component of UDC 200. The risk indicator provides an indication of risk to a preferred functionality due to an attack from another internal component.

Utility controller database 292 comprises configuration information pertaining to the various resources in UDC 200, including descriptions of the configuration, characteristics, and/or features of a component. For example configuration information can include but not necessarily be limited to indications of the types of devices in UDC 200, representations of each VLAN, a network or MAC (media access control) address for the resources of UDC 200, port numbers of the configurable components, VLAN identifiers associated with each of the port numbers, socket identifier for each cable connected to each of the resources of UDC 200, manufacturer identifiers, model indicators, and/or serial numbers. Utility controller database 292 also includes an exposure rating value and an asset value for each resource in UDC 200. As resources in UDC 200 are changed (e.g., reallocated), the information in utility controller database 250 is also changed accordingly (e.g., to reflect the reallocation). Changes to the utility controller database 250 can also be used to drive changes to the allocation of resources in UDC 200.

In one embodiment, utility controller database 292 is embodied as a computer-readable network map. The map can represent a spanning tree configuration of the resources included in UDC 200. It is understood that such a map need not exist in the form conventionally associated with human-readable maps. It is also appreciated that a computer-readable network map can be synthesized on-the-fly from the information stored in utility controller database 292. The network map can include information pertaining to each of the computing resources in the UDC 200 (e.g., configuration attributes, asset value, exposure rating, risk indicator, etc.).

Server 271 includes a network application management platform 273 (e.g., an open view operation network application management platform) for managing resources in UDC 200 in accordance with information included in utility database 292. For example, utility controller 272 enables the creation, deployment, allocation, and management of VLANs. In one exemplary implementation, utility controller 272 can monitor deployed VLANs, and automatically reallocate resources when there is a reason to do so. In addition, the utility controller 272 monitors shared infrastructure resources, alerting NOC 270 of failures or other significant events. Utility controller 272 utilizes network application management platform 273 to manage resources in UCD 200.

Internal attack assessment component 274 directs creation of the spanning tree representation including asset value indications and exposure ratings. Internal attack assessment component 274 coordinates the collection of asset value and exposure ratings for each of the components included in UDC 200 and provides a topological view of the relative risk on an attack on one component or element has on another component or element of UDC 200. The centralized user friendly efficient coordination and correlation of the internal attack spread threat to UDC 200 as disclosed herein, helps in reducing cost by facilitating reduction of the number of operators having specialized knowledge of associated with each component of included in UDC 200 and the importance and nature of the functionality provided by those components in supporting various application implementations.

In one embodiment of the present invention, internal attack assessment component 274 automatically determines asset value indications. In one exemplary implementation, the asset value indication corresponding to certain types of applications are maintained (e.g., in a table) and when an application is selected for deployment in association with components of a centralized resource network the asset value indication is assigned to the components. It is appreciated that there is a variety of ways in which an asset value can be automatically determined. For example, the number of security appliances or applications (e.g., Firewalls, IDS components, etc) between a centralized resource network component or network node and a root node can be tracked and components with more protection can be assigned a higher asset value. Components usually reserved for mission critical applications (e.g., high availability components or clusters) and/or particular components (e.g., a database server) can be assigned high asset values. Types of components that provide functionality more directed to facilitation of processing rather than processing the information directly (e.g., nodes, load balancers, proxy servers, network services) can be assigned a mid range asset value. The component size and operating system can be analyzed and assigned an asset value accordingly (e.g., larger size receives higher asset value).

In addition to computer systems and switches, the UCD 200 can include other types of components such as, but not limited to, routers, load balancers, firewalls, and hubs. These other types of devices may also be programmable or configurable. Although described primarily in the context of UDC 200, the features of the present invention are not so limited. The present invention can be used with a variety of components in various configurations.

Figure 3:
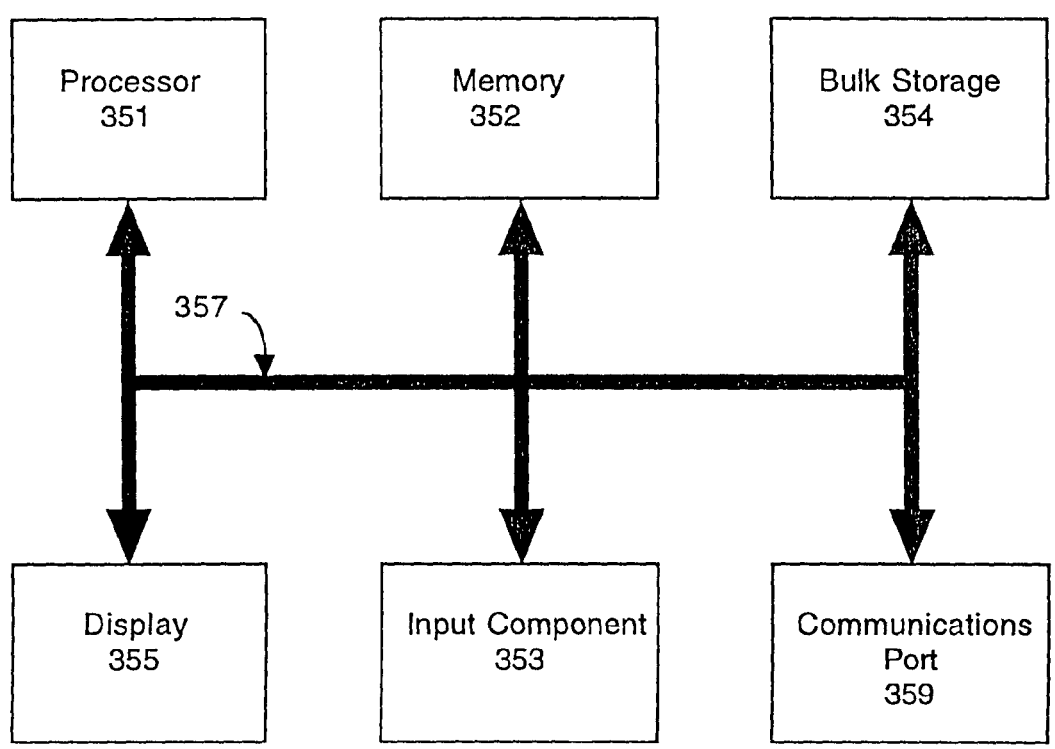
FIG. 3 is a block diagram of a computer system on which a present invention security indication spanning tree system and method can be implemented.

FIG. 3 is a block diagram of computer system 300, one embodiment of a computer system on which a present invention security indication spanning tree system and method can be implemented. For example, computer system 300 can be utilized to implement security indication spanning tree method 100 and/or Network Operation Center 270. Computer system 300 includes communication bus 357, processor 351, memory 352, input component 353, bulk storage component 354 (e.g., a disk drive), network communication port 359 and display module 355. Communication bus 357 is coupled to central processor 351, memory 352, input component 353, bulk storage component 354, network communication port 359 and display module 355.

The components of computer system 300 cooperatively function to provide a variety of functions, including performing indication of internal spread threats associated with intrusive attacks in accordance with the present invention. Communication bus 357 communicates information. Processor 351 processes information and instructions, including instructions for building an attack impact susceptibility spanning tree representation including asset value factors. For example, the instructions can include directions for determining asset value of a network node; ascertaining exposure rating of the network node; analyzing impact risk to a preferred functionality due to an attack from another network node; and creating a spanning tree schematic of a network including the network node, wherein the spanning tree schematic includes an indication of the asset value. Memory 352 stores information and instructions, including instructions for building an attack impact susceptibility spanning tree representation including asset value factors. Bulk storage component 354 also provides storage of information. Input component 353 facilitates communication of information to computer system 350. Display module 355 displays information to a user. Network communication port 359 provides a communication port for communicatively coupling with a network.

Figure 4:
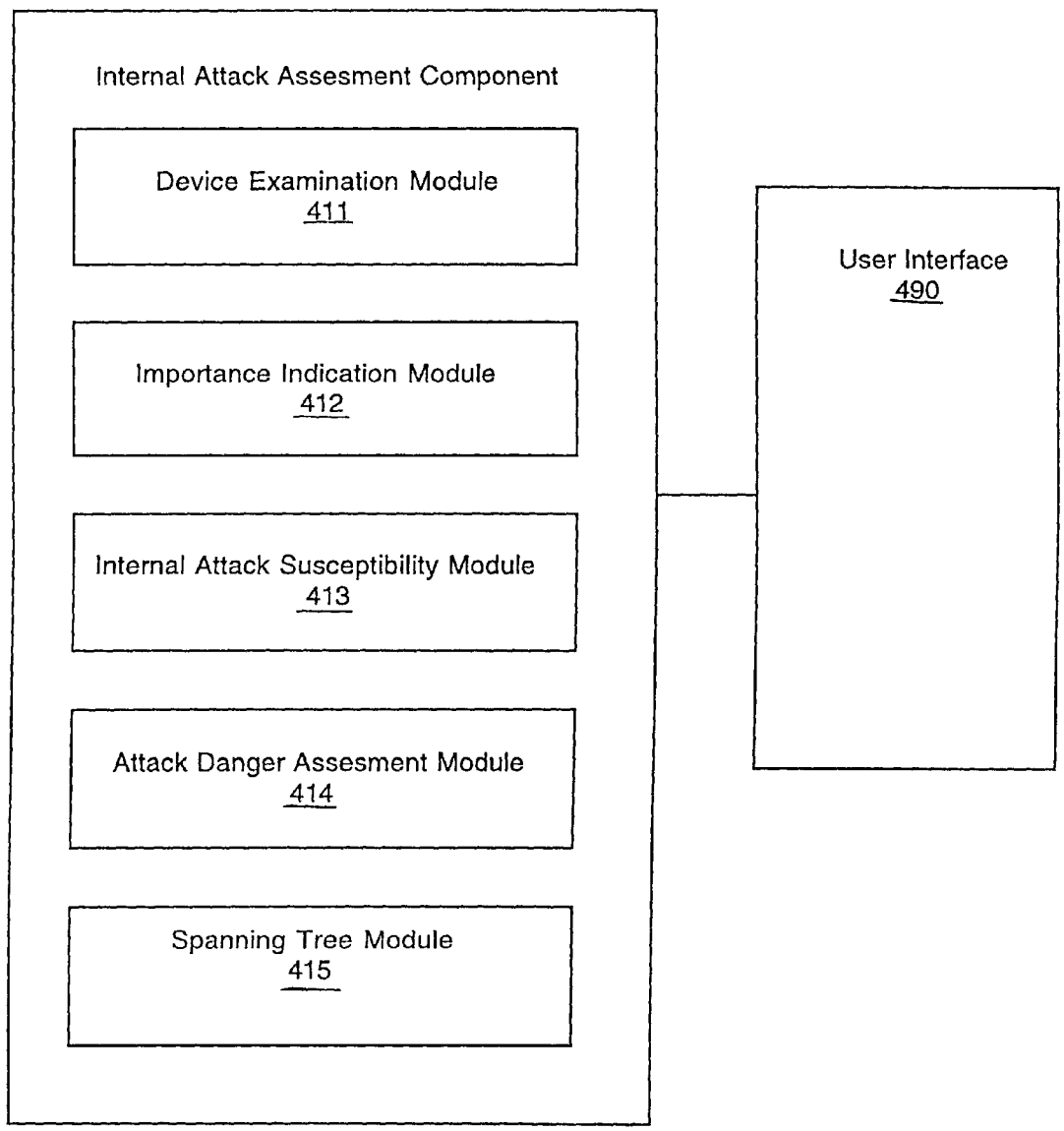
FIG. 4 is a block diagram of a security indication spanning tree system in accordance with one embodiment of the present invention.

FIG. 4 is a block diagram of security indication spanning tree system 400 in accordance with one embodiment of the present invention. In one embodiment security indication spanning tree system 400 is implemented on a computer system (e.g., computer system 300). Security indication spanning tree system 400 includes internal attack assessment component 410 and user interface 490. User Interface 490 provides an user interface for presenting asset value, exposure rating and risk to a user in a convenient and user friendly presentation. User interface 490 can also receive user input. Internal attack assessment component 410 includes device examination module 411, importance indication module 412, internal attack permeability module 413, attack danger assessment module 414, and spanning tree module 415, which can include computer readable instructions (e.g., software, programmable code, etc). For example, security indication spanning tree system 400 can include computer readable program code embodied on a computer usable storage medium, wherein the computer readable program code causes a computer system to implement security indication spanning tree instructions.

Device examination module 411 examines information regarding devices included in a centralized resource network (e.g., server farm, UDC, etc.). The examination includes ascertaining a device identification (e.g., MAC address, IP address, etc.) and which applications the devices provide functional support to. For example, whether a device provides functional support for important organization information (e.g., company information) or functional support for a web server.

Importance indication module 412 obtains an indication of the relative importance of the functionality provided by the device. For example, functional support for important organization information (e.g., company information) can be more important than functional support for a web server.

Internal attack permeability module 413 investigates the permeability of a network in permitting an intern attack on a device from other devices included in the network. In one embodiment the investigating includes analyzing the ease of attack on the device from other devices in a centralized resource network and assigning an connectivity openness or exposure threshold value to the device based upon the analysis of the ease of attack.

Attack danger assessment module 414 assesses the danger of an attack from other devices included in the network. In one embodiment of the present invention, assessing the danger includes deriving an attack danger indication based upon the indication of the relative importance of the device and the exposure threshold value and associating the attack danger indication with the device.

Spanning tree module 415 builds a spanning tree topology representation including an indication of the relative importance of the device in supporting applications. For example, the devices operations that facilitate application implementation. In one embodiment the relative importance of the device is based upon an economic value of functions the device performs in support of the applications.

Thus, the present invention security indication spanning tree system and method facilitate determination and analysis of intrusive attack spread threats from within a network. The security indication spanning tree system and method provide a comprehensive and convenient spanning tree representation including an indication of the correspondence of component disruption impacts to important applications and susceptibility of the component to attack from other components within a network. The efficient and convenient security indication spanning tree information rapidly provides presentation of the relative economic value of disruptions in a component functionality and the relative likelihood of an attack spreading to the component. The rapid and accurate presentation of the information facilitates minimization of human errors when attempting to identify important and susceptible centralized resources during an intrusive attack on a centralized resource network. The information organization provides prioritization of the importance of a component and an assessment of attack danger. The spanning tree can include the asset values for various components within the network. The spanning tree can also provide an exposure rating that indicates the likelihood of an attack spreading to other systems in a network (e.g., server farm, UDC, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

The invention claimed is:

1. A security indication spanning tree method comprising:
   determining asset value of a network node;
   ascertaining exposure rating of said network node;
   establishing a functional priority risk indicator for indicating the likelihood of an attack from another network node; and
   creating a spanning tree schematic of a network including said network node, wherein said spanning tree schematic includes an indication of said asset value.

2. A security indication spanning tree method of claim 1 wherein said spanning tree schematic includes an indication of said exposure rating.

3. A security indication spanning tree method of claim 1 wherein said spanning tree schematic includes an indication of said attack risk.

4. A security indication spanning tree method of claim 1 wherein said asset value provides an indication of an economic value of functions provided by said network node.

5. A security indication spanning tree method of claim 1 said asset value corresponds to an economic impact of a disruption to functionality provided by said network node.

6. A security indication spanning tree method of claim 1 wherein said exposure rating defines a threshold value corresponding to connectivity of the network node with other network nodes.

7. A security indication spanning tree method of claim 1 wherein said network node is given an exposure rating value based upon a connectivity distance from a root node.

8. A security indication spanning tree method of claim 1 wherein said root node is a node closest to an external network.

9. A security indication spanning tree method of claim 1 wherein said functional priority risk indicator is associated with an economic benefit and utility of functionality said network node provides.

10. A security indication spanning tree system comprising:
    a bus for communicating information;
    a processor coupled to said bus, said processor for processing said information including instructions for building an attack impact susceptibility spanning tree representation including asset value factors; and
    a memory coupled to said bus, said memory for storing said information, including instructions for building said attack impact susceptibility spanning tree representation including said asset value factors.

11. A security indication spanning tree system of claim 10 wherein said asset risk value is automatically determined.

12. A security indication spanning tree system of claim 10 further comprising a central console for interfacing with a network application management platform.

13. A security indication spanning tree system of claim 10 wherein said instructions include attack spread risk determination instructions.

14. A security indication spanning tree system of claim 10 wherein said instructions include exposure rating determination directions.

15. A computer usable storage medium having computer readable program code embodied therein for causing a computer system to implement security indication spanning tree instructions comprising:
    a device examination module for examining information regarding devices included in a centralized resource network, wherein said examining includes ascertaining what applications said devices support;
    an importance indication module for obtaining an indication of a relative importance of functionality provided by said device; and
    a spanning tree module for building a spanning tree topology representation including said indication of said relative importance of said device in supporting said applications.

16. A computer usable storage medium of claim 15 herein said relative importance of said device is based upon an economic value of functions said devices performs in support of said applications.

17. A computer usable storage medium of claim 15 further comprising an internal attack permeability module for investigating the permeability of a network in permitting an internal attack on a device from other devices included in the network.

18. A computer usable storage medium of claim 17 wherein said investigating includes:
    analyzing the ease of attack on said device from other devices in said centralized resource network; and
    assigning an connectivity threshold value to said device based upon said analysis of said ease of attack.

19. A computer usable storage medium of claim 15 further comprising an attack danger assessment module for assessing the danger of an attack from other devices included in said network.

20. A computer usable storage medium of claim 19 further comprising:
    deriving an attack danger indication based upon said indication of said relative importance of said device and said connectivity threshold value; and associating said attack danger indication with said device.

* * * * *

UNITED STATES PATENT AND TRADEMARK OFFICE
CERTIFICATE OF CORRECTION

PATENT NO. : 8,042,187 B2
APPLICATION NO. : 10/648531
DATED : October 18, 2011
INVENTOR(S) : Stuart Cain Page 1 of 1

It is certified that error appears in the above-identified patent and that said Letters Patent is hereby corrected as shown below:

In column 9, line 31, in Claim 5, before "said" insert -- wherein --.

In column 10, line 29, in Claim 16, delete "herein" and insert -- wherein --, therefor.

Signed and Sealed this
Twenty-eighth Day of August, 2012

David J. Kappos
*Director of the United States Patent and Trademark Office*